3,016,397
PROCESS FOR OXIDIZING ALUMINUM
HYDROCARBONS
Robert A. Walde, Pittsburgh, Pa., assignor to Goodrich-Gulf Chemicals, Inc., Cleveland, Ohio, a corporation of Delaware
No Drawing. Filed Sept. 25, 1958, Ser. No. 763,206
4 Claims. (Cl. 260—448)

This invention relates to organo-metallo compounds and more particularly to an improved process for oxidizing organo-metallo compounds.

Organo-metallo compounds can be oxidized and subsequently hydrolyzed to obtain alcohols. Unfortunately, the oxidation reaction requires an extended period of time and many decomposition and degradation products are formed along with the desired oxidized product. Therefore, when the product resulting from oxidation is hydrolyzed a smaller amount of alcohol is obtained than would be expected, and the same is contaminated with said decomposition and degradation products.

I have found that the above difficulties can be avoided and an alcohol product in good yields and of excellent purity can be obtained by conducting the oxidation reaction within certain well-defined temperature ranges.

The organo-metallo compounds which can be employed in the oxidation reaction of this invention can be represented by the following structural formula:

$$R_aMeX_b$$

wherein $a$ is an integer of one to four, $b$ is an integer of 0 to 3, X can be hydrogen, a halide (fluorine, chlorine or bromine), an alkoxide, such as methoxide, ethoxide, propoxide, etc., or hydroxyl; and R is a hydrocarbon radical, the same or different, having from 2 to 30 carbon atoms, preferably 5 to 20 carbon atoms, such as alkyl, aryl, alkaryl, aralkyl, cycloalkyl, alkenyl, aralkenyl, or cycloalkenyl, straight or branch chained, or a substituted hydrocarbon radical. Me is a metal such as aluminum, antimony, bismuth, boron, cadmium, copper, gallium, germanium, indium, lead, mercury, thallium, tin and zinc, and $a+b$ is the valence of Me. Examples of such organo-metallo compounds are trioctyl aluminum, dioctyl-aluminum chloride, tri-2-ethylhexyl boron, diisobutyl aluminum hydride, etc. Preferred among the compounds listed are the aluminum alkyls.

In carrying out the process of this invention it is absolutely necessary, in order to obtain a high yield of alcohol upon hydrolysis of the oxidation product, and reduce decomposition and degradation products, that the oxidation reaction be carried out within a low temperature range, specifically from about 0° to about 70° C., preferably from about 40° to about 60° C. The time necessary for the oxidation of the organo-metallo compound is thus about 10 to about 60, preferably about 20 to about 40 minutes.

In order to obtain a high yield of alcohol upon hydrolysis of the oxidation product and reduce decomposition and degradation products, not only must the temperature of reaction be maintained within the above temperature ranges but in no event can the temperature in the reaction zone at any fixed moment be permitted to vary more than about 8° C., preferably no more than about 5° C., above the desired reaction temperature. This can be effected by passing oxygen through the organo-metallo compound while the latter is being stirred at a sufficient rate, preferably using equipment such as baffles, dispersion stirrers, etc., which will insure good gas-liquid homogenization.

Desirably the oxidation reaction is carried out in the presence of about 0.01 to about 5, preferably about 0.1 to about one, mole percent, based on the organo-metallo compound, of a salt of a metal selected from the group consisting of cobalt, manganese and iron. Examples of such salts are cobalt acetylacetonate, manganese acetylacetonate, iron acetylacetonate, cobalt chloride, cobalt naphthenate, manganese naphthenate, etc.

The oxidation can be carried out in air or oxygen, preferably by passing the latter through the organo-metallo compound. The amount of oxygen required is dependent upon the number of R groups (defined hereinabove) on the organo-metallo compound being oxidized. For example, aluminum trialkyls require 1.5 moles of oxygen per mole of aluminum alkyl, whereas the dialkyls require only one mole of oxygen per mole of dialkyl. Generally, 0.5 mole of oxygen are required per R group per mole of organo-metallo compound. Oxygen or air should be added at such a rate that there is always an excess of oxygen present in the system. If oxygen is used it should be added at such a rate that there is only a slight amount of exit oxygen as noted by a bubble. This will insure sufficient oxygen but eliminate any large volume of recycle oxygen. The pressure can be about atmospheric to about 2000 pounds per square inch, preferably atmospheric to about 500 pounds per square inch.

The oxidized product can then preferably be hydrolyzed with a hydrolysis medium such as water-hydrochloric acid, water-sulfuric acid, water-acetic acid, etc., at a temperature of about 0° to about 100° C. and a pressure of about 200 millimeters of mercury to about 500 pounds per square inch to obtain an alcohol corresponding to the alkyl on the alkoxide and a metal hydroxide. The two can be separated in any convenient manner, e.g., by decantation.

The invention can better be understood by reference to the following examples.

Example I below illustrates the fact that oxidation at high temperatures results in lower yields of alcohol than would be expected, apparently because of loss of product to decomposition and degradation products.

*Example I*

Into a 500 cc. Morton flask equipped with a stirrer were charged 110.2 grams of trioctylaluminum and 25 grams of normal cetane as solvent. Oxygen was added to the contents of the flask at the rate of 0.020 cubic foot per minute. The oxidation was run, with a stirring rate of 3500 revolutions per minute, at atmospheric pressure and a temperature of 105° C. wherein the maximum temperature differential was no more than two degrees centigrade. The alkyl was oxidized for 60 minutes. The alkoxide obtained was stripped of all volatile material by heating the same at a temperature of 40° C. and a pressure of 5 mm. Hg. The alkoxide was thereafter hydrolyzed with 266 grams of a mixture of water and 38 percent aqueous hydrochloric acid at a temperature of 40° C. and a pressure of 15 pounds per square inch. The aqueous layer was then separated from the organic or alcohol layer. 97.47 grams of octyl alcohol was obtained, showing that 83 percent of the $C_8$ alkyl groups on the trioctylaluminum charge was oxidized during the oxidation.

The results obtained above should be contrasted with the results obtained in Example II which was conducted in accordance with my improved process.

*Example II*

94.5 grams of trioctylaluminum and 25 cc. of normal cetane as solvent were charged into a Morton flask as in Example I, and the same stirring rate, pressure and oxidation rate were maintained. A temperature of 50° C., wherein the maximum temperature differential was no more than two degrees centigrade, however, was used, and the alkyl was oxidized for 45 minutes. The resulting alkoxide was hydrolyzed and 95.77 grams of octyl alcohol obtained in a manner similar to that obtained in Example I. This shows that 95 percent of the C₈ alkyl groups in the charge was oxidized.

While operation in accordance with the process described in Example II, that is, at a temperature within the preferred ranges defined hereinabove, resulted in an increase in oxidation of C₈ alkyl groups on the order of about 12 percent over the oxidation in Example I, Example III, below, shows that further improved results are obtained when a metal salt is added to the charge being oxidized.

*Example III*

As in Example II, 109 grams of trioctylaluminum in 25 cc. of normal cetane were placed in a Morton flask and oxidized. The reaction conditions were maintained as in Example II except that the temperature was maintained at 55° C., wherein the maximum temperature differential was no more than two degrees centigrade, and 0.5 gram of cobalt acetyl acetonate were added to the charge. The oxidation was found to cease at the end of 38 minutes. The alkoxide obtained was hydrolyzed as in Example I and 114.32 grams of octyl alcohol was recovered. This shows that 98.2 percent of the C₈ alkyl groups on the trioctylaluminum was oxidized.

That it is extremely critical that the reaction temperature in the reaction zone at any fixed moment be permitted to vary no more than about 8° C., preferably no more than about 5° C., above the desired reaction temperature is apparent from a comparison of Example IV with Example V.

*Example IV*

Into a 500 cc. Morton flask were placed 130 grams of tri 2-ethylhexyl aluminum in 100 grams of 2-ethyl hexene as solvent. Oxygen was added to the flask at the rate of 2 grams per hour while the mixture was stirred at the rate of 500 revolutions per minute. The oxidation was run at atmospheric pressure and a temperature of 50° C. wherein the maximum temperature differential was 9° C. It was found that the oxidation had ceased at the end of six hours. The alkoxide was treated as in Example I and 86 grams of 2-ethylhexyl alcohol was obtained. This shows that 63 percent of the alkyl groups on the charge to the oxidation reaction was oxidized.

*Example V*

The run of Example IV was repeated in identical fashion except that the temperature was maintained at 60° C. and mixing was effected at 5000 to 6000 revolutions per minute. The maximum temperature differential was no more than one degree centigrade. Oxidation in the case ceased at the end of 30 minutes. After hydrolysis, 122 grams of 2-ethylhexyl alcohol was obtained. This shows that 88 percent of the alkyl groups on the charge was oxidized.

Obviously many modifications and variations of the invention, as hereinabove set forth, can be made without departing from the spirit and scope thereof, and therefore only such limitations should be imposed as are indicated in the appended claims.

I claim:

1. A process for oxidizing an aluminum hydrocarbon, wherein said hydrocarbon has from two to thirty carbon atoms and is represented by the following srtuctural formula AlR₃, wherein R is an alkyl group, which comprises oxidizing said aluminum hydrocarbon in oxygen at a selected temperature within the range of about 0° to 70° C. while permitting the temperature at any point in the reaction zone to vary no more than about 8° C. above the selected temperature.

2. A process for oxidizing an aluminum alkyl, wherein said alkyl has from two to thirty carbon atoms, which comprises oxidizing said aluminum alkyl in oxygen at a selected temperature within the range of about 0° to about 70° C. while permitting the temperature at any point in the reaction zone to vary no more than about 8° C. above the selected temperature.

3. A process for oxidizing trioctylaluminum which comprises oxidizing the same in oxygen at a selected temperature within the range of about 0° to about 70° C. while permitting the temperature at any point in the reaction zone to vary no more than about 8° C. above the selected temperature.

4. A process for oxidizing tri-2-ethylhexyl aluminum which comprises oxidizing the same in oxygen at a selected temperature within the range of about 0° to about 70° C. while permitting the temperature at any point in the reaction zone to vary no more than about 8° C. above the selected temperature.

References Cited in the file of this patent

UNITED STATES PATENTS 2,873,290    Esmay et al.    Feb. 10, 1959
2,892,858    Ziegler    June 30, 1959

OTHER REFERENCES

Groggins: Unit Processes in Organic Synthesis, 4th edition, pages 436, 439 and 441 (1952).
Ziegler et al.: Angew. Chem. vol. 67, page 425 (1955).
Rochow et al.: The Chemistry of Organometallic Compounds, page 134 (1957).